UNITED STATES PATENT OFFICE.

GEORGE O. BOYNTON, OF BOSTON, AND GEORGE STEPHEN, OF SOMERVILLE, MASSACHUSETTS.

EMERY-WHEEL.

SPECIFICATION forming part of Letters Patent No. 305,139, dated September 16, 1884.

Application filed February 9, 1884. (No specimens.)

*To all whom it may concern:*

Be it known that we, GEORGE O. BOYNTON and GEORGE STEPHEN, respectively of Boston and Somerville, in the counties of Suffolk and Middlesex and State of Massachusetts, have invented certain new and useful Improvements in Emery-Wheels, of which the following is a full, clear, and exact description.

This invention relates to a tool or implement or other article, preferably in the form of a wheel, for cutting, grinding, and polishing metals and substances, more especially soft metals, such as brass, britannia, &c.; and the invention consists in making such tool or implement or wheel of paper-pulp, preferably of wood pulp, and combining with it emery or sand or alumina or other suitable granulated substance or substances, and either separately or in combination, one with anothor, or with each other, and with borax and a size—such as soda-ash and resin and glue—all substantially as hereinafter fully described.

In carrying out this invention, first take one hundred (100) pounds of paper-pulp, wood pulp being preferable, and put it into a suitable vessel with sufficient water to cover the pulp, and then place the vessel over a fire with sufficient heat to boil the pulp. When boiling, add three (3) pounds of borax and thoroughly mix the whole together. In another suitable vessel put one-half (½) pound of soda-ash and one (1) pound of resin, and after thoroughly mixing them together put them into the vessel with the pulp and mix the whole thoroughly together, and then add four (4) pounds of glue, properly prepared with water, and forty-five (45) pounds of emery while the pulp is hot, and then, putting the whole in a suitable tank having a suitable agitator, agitate and stir the whole thoroughly together for about three (3) or four (4) hours, when the compound will be in a suitable condition to be molded, as desired, which, for the purposes of this invention, is in the form of a wheel. The compound is placed in the mold of the shape and size desired, and the mold placed in a suitable press, where it is pressed with the desired and sufficient pressure to make it firm, compact, and solid, after which it is removed from the mold and allowed to dry in the atmosphere, when it is ready for use.

In lieu of emery, sand or quartz, alumina, or other granulated substance or substances can be used, and either alone or in combination one with another or with each other; also, any suitable adhesive material can be used instead of glue. It is preferable to use a paper-pulp made from wood, although pulp made from any suitable material can be used with good results. The soda-ash and resin form a size which serves to separate the fibers of the pulp, so that when pressed in the mold they will be laid more regularly and evenly, and thereby make a closer and firmer tool or wheel. Any other size, however, can be used; but a size of soda-ash and resin is preferable.

The proportions herein named of the several ingredients can be varied somewhat without departing from this invention, and yet produce good results, and they may be combined together in other ways than as stated, but as herein described are satisfactory, practical, and preferable.

A tool, implement, or wheel constructed of the materials and in the manner herein described is suitable for grinding and polishing brass, britannia, or other soft metals, and such a tool or wheel is very elastic, and takes the place of wooden wheels covered with leather, having emery glued on their outer surface, and is superior to such, in that it works better and is more durable, lasting until entirely worn out or used up.

Having thus described our invention, what we claim, and desire to secure by Letters Patent, is—

1. The composition consisting of paper-pulp and emery or sand, alumina, or other suitable granulated material, either separately or in combination one with another or with each other, and borax, glue, and a size, substantially as and for the purpose specified.

2. The composition consisting of paper-pulp and emery, or sand, alumina, or other suitable granulated material, either separately or in combination one with another or with each other, and borax, glue, and a size composed of soda-ash and resin, all substantially as and for the purpose specified.

3. As a new article of manufacture, an emery-wheel composed of paper-pulp, emery, borax, glue, and a size, substantially as described.

4. As a new article of manufacture, an emery-wheel composed of paper-pulp, emery, borax, glue, and a size composed of soda-ash and resin, all substantially as described.

In testimony whereof we have hereunto set our hands in the presence of two subscribing witnesses.

GEORGE O. BOYNTON.
GEORGE STEPHEN.

Witnesses:
EDWIN W. BROWN,
WM. S. BELLOWS.